(12) United States Patent
Falk et al.

(10) Patent No.: US 11,106,828 B2
(45) Date of Patent: Aug. 31, 2021

(54) METHOD AND APPARATUS FOR PROVIDING A CRYPTOGRAPHIC SECURITY FUNCTION FOR THE OPERATION OF A DEVICE

(71) Applicant: SIEMENS MOBILITY GMBH, Munich (DE)

(72) Inventors: Rainer Falk, Poing (DE); Dominik Merli, Mertingen (DE); Stefan Pyka, Markt Schwaben (DE)

(73) Assignee: SIEMENS MOBILITY GMBH

( * ) Notice: Subject to any disclaimer, the term of this patent is extended or adjusted under 35 U.S.C. 154(b) by 124 days.

(21) Appl. No.: 16/085,603

(22) PCT Filed: Mar. 7, 2017

(86) PCT No.: PCT/EP2017/055244
§ 371 (c)(1),
(2) Date: Sep. 17, 2018

(87) PCT Pub. No.: WO2017/162424
PCT Pub. Date: Sep. 28, 2017

(65) Prior Publication Data
US 2019/0095648 A1      Mar. 28, 2019

(30) Foreign Application Priority Data

Mar. 22, 2016   (DE) ............... 10 2016 204 684.5

(51) Int. Cl.
| | |
|---|---|
| *H04L 29/06* | (2006.01) |
| *G06F 21/72* | (2013.01) |
| *H04L 9/32* | (2006.01) |

(52) U.S. Cl.
CPC ............ *G06F 21/72* (2013.01); *H04L 9/3236* (2013.01); *H04L 9/3247* (2013.01);
(Continued)

(58) Field of Classification Search
CPC ............ G06F 21/72; G06F 2221/2151; H04L 9/3236; H04L 9/32
(Continued)

(56) References Cited

U.S. PATENT DOCUMENTS

| | | |
|---|---|---|
| 5,956,505 A | 9/1999 | Manduley |
| 6,721,888 B1 | 4/2004 | Liu et al. |

(Continued)

FOREIGN PATENT DOCUMENTS

| | | |
|---|---|---|
| CN | 101958913 A | 1/2011 |
| CN | 102393890 A | 3/2012 |

(Continued)

OTHER PUBLICATIONS

International Search Report for Related Application PCT/EP2017/055244; dated May 17, 2017; 3 Pages.
(Continued)

*Primary Examiner* — Evans Desrosiers
(74) *Attorney, Agent, or Firm* — Schmeiser, Olsen & Watts LLP

(57) ABSTRACT

Provided is a method and apparatus for providing a cryptographic security function for the operation of a device, and to an associated computer program (product). The method for providing a cryptographic security function for the operation of a device carries out the following steps: receiving a request to provide such a security function, providing an interface to a point providing such a security function, said point being called a trust anchor, wherein said interface determines context information in accordance with the application initialing the request, providing the requested security function for the application initiating the request, wherein the determined context information influences the provision of said security function.

11 Claims, 1 Drawing Sheet

(52) U.S. Cl.
CPC ............... *G06F 2221/2103* (2013.01); *G06F 2221/2151* (2013.01); *G06F 2221/2153* (2013.01)

(58) Field of Classification Search
USPC .......................................................... 713/189
See application file for complete search history.

(56) References Cited

U.S. PATENT DOCUMENTS

| | | | |
|---|---|---|---|
| 7,369,657 B2 * | 5/2008 | Eldeeb | .................... G06F 21/72 380/28 |
| 7,818,815 B2 | 10/2010 | Kamiya et al. | |
| 8,087,078 B2 | 12/2011 | Kamiya et al. | |
| 8,504,479 B2 | 8/2013 | Bader et al. | |
| 2003/0084286 A1 | 5/2003 | Bader et al. | |
| 2005/0050315 A1 | 3/2005 | Burkhardt et al. | |
| 2005/0235291 A1 | 10/2005 | Kamiya et al. | |
| 2007/0168677 A1 | 7/2007 | Kudo et al. | |
| 2008/0188308 A1 * | 8/2008 | Shepherd | ............ G07F 17/3239 463/39 |
| 2009/0193515 A1 | 7/2009 | Kamiya et al. | |
| 2009/0276841 A1 | 11/2009 | Guo et al. | |
| 2014/0040748 A1 * | 2/2014 | Lemay | ................ G10L 15/1822 715/728 |
| 2014/0189808 A1 | 7/2014 | Mahaffey et al. | |
| 2014/0295794 A1 | 10/2014 | Doumen | |
| 2017/0061832 A1 * | 3/2017 | Ghosh | ...................... G09C 1/00 |

FOREIGN PATENT DOCUMENTS

| | | |
|---|---|---|
| CN | 103608819 A | 2/2014 |
| CN | 104021335 A | 9/2014 |
| EP | 1102153 A1 | 5/2001 |
| EP | 1102153 A2 | 5/2001 |
| EP | 1507211 A1 | 2/2005 |
| WO | 03021427 A2 | 3/2003 |
| WO | WO 03021427 A2 | 3/2003 |

OTHER PUBLICATIONS

International Search Report for PCT/EP2017/055244.
Zhoufan, Li et al.; "Agent-based Certification Path Building Method"; (Department of Information and Eletronic Engineering, Shangai Jiaotong University, Shanghai 200030); Sep. 2006.
Chinese Office Action dated May 8, 2021 for Application No. 201780019138.8.

* cited by examiner

METHOD AND APPARATUS FOR PROVIDING A CRYPTOGRAPHIC SECURITY FUNCTION FOR THE OPERATION OF A DEVICE

CROSS-REFERENCE TO RELATED APPLICATIONS

This application claims priority to PCT Application No. PCT/EP2017/055244, having a filing date of Mar. 7, 2017, based on German Application No. 10 2016 204 684.5, having a filing date of Mar. 22, 2016, the entire contents both of which are hereby incorporated by reference.

FIELD OF TECHNOLOGY

The following relates to a method and an apparatus for providing a cryptographic security function for the operation of a device, and to an associated computer program (product).

BACKGROUND

Devices, for example embedded systems, are nowadays found in all branches of industry. The (cryptographic) protection of these devices is playing an increasingly important role, in order to be able to ensure secure operation. Using cryptographic functions, it is possible to achieve aims such as integrity, confidentiality or authenticity of these platforms. As a result, deliberate targeted attacks are repelled.

One possibility for securing an embedded system is to integrate a hardware-based trust anchor. This may perform various tasks, for example a security function may make cryptographic keys available to a security application at runtime, create and test integrity test values of application and configuration data, sign data, provide cryptographically strong random numbers, and much more.

The term 'anchor' stems from the fact that security or trust position concepts of the data processing installations use the trust anchor as a basis, and it is or has to be required here that the trust anchor itself is secure and uncompromised.

One possible trust anchor is for example the trusted platform module (TPM) specified by ISO/IEC 11889 in 2009 that is present in every modern PC and is mandatorily required by modern operating systems for certain cryptographic operations. For example, the hard disk encryption 'BitLocker' of the widespread operating system 'Windows' is based on a TPM. A trust anchor may for example also be implemented by a crypto-controller, by what is known as a secure element (for example an authentication semiconductor chip), or in firmware.

According to FIG. 1, the following scenario may be envisaged with a trust anchor. An embedded system ES, for example a device or a control computer, comprises at least one application A. The system ES typically also comprises an operating system, not shown in the figure, such as for example VxWorks, FreeRTOS, Linux or Microsoft Windows. Also not shown in the figure, the device generally has a control unit CPU and provides a USB interface that is connected to an externally accessible USB port of the device. Configuration data, for example in encrypted form, may be stored on a plugged-in USB storage module (or SD card). Furthermore, the device may have program memories (Flash) and volatile memories (RAM), a network interface (for example Ethernet) and an input/output unit (I/O) to which peripherals (sensors, actuators) may be connected. A secure element may furthermore be provided as a trust anchor.

What are known as apps or applications may make requests to the secure element so as to have it calculate cryptographic functions.

This may be for example a control application or a diagnostic application. Said application communicates with a trust anchor V of the system ES via an apparatus E or via a driver or a kernel module. The apparatus E communicates with a trust anchor V. An application A constructs for example a cryptographically protected communication connection for example via a wired and/or wireless communication network, for example WLAN, Ethernet, etc., or it would like to encrypt configuration data. To execute this secure function, the application A requests a cryptographic security function, for example a key, a key derivation or a signature calculation. Optionally, a security parameter SP, for example a key derivation parameter or a key identification parameter, that is able to be predefined by the application A, is transmitted to the trust anchor. The apparatus E then obtains a cryptographic security function K from the trust anchor V, for example in the form of a fixed key or a key derived depending on the security parameter SP, which key is passed on to the application in order to secure the communication connection.

However, if an attacker application has taken over the device or the apparatus during operation, it may make requests to the trust anchor dynamically, which then executes any desired cryptographic operations or security functions for it. This may significantly impair the security of the device.

SUMMARY

An aspect relates to a method and a security module that prevent unauthorized access to the trust anchor.

The embodiment claims a method for providing a cryptographic security function for the operation of a device, wherein the following method steps are executed:
  receiving a request to provide such a security function,
  providing an interface to a location making available such a security function, called a trust anchor,
  wherein said interface determines an item of context information depending on the application initiating the request,
  providing the requested security function for the application initiating the request,
  wherein the determined item of context information is integrated into the provision of said security function.

One development of embodiments of the invention provides that the item of context information is integrated into the provision of the security function as a parameter, for example as a security parameter.

The security function may be provided in the form in which it is executed. The execution may deliver a response value. A conceivable response value is a (derived) key, a signature and further cryptographic function values.

One development of embodiments of the invention provides that the item of context information is integrated into the provision of the security function as a one-way function value.

One development of embodiments of the invention provides that the item of context information modifies and/or influences the value resulting from the security function. In this case, the security function value is changed correspondingly after the execution of the security function.

One development of embodiments of the invention provides that the interface transfers the determined item of context information to the trust anchor.

One development of embodiments of the invention provides that the item of context information is transferred in a secure format.

One development of embodiments of the invention provides that the secure format is achieved by conversion by way of a one-way function or by way of a signature or by way of an authentication code or by way of generation or derivation of a key or in any desired combination thereof.

One development of embodiments of the invention provides that the item of context information comprises the identity of said application.

The item of context information may in this case be characterized by the following:
- the name of the application
- the creation date of the application
- hash value of the executable file
- the user name that calls the application
- the user group that calls the application
- the process ID of the process that calls the application
- the namespace of the process or of the user that calls the application. Within a namespace, objects may be addressed unambiguously, for example via pathnames.
- the name or namespace of the device via which the ESK (embedded security kernel) is addressed (for example in Linux: '/dev/esk'),
- a (security enhanced Linux) identifier or operating system-specific identifier of the accessing user or process or of the device or system (role, user name, domain, type, context)
- other (operating system-specific) data regarding the application or the current state.

A further aspect of embodiments of the invention provides an apparatus for providing a cryptographic security function for the operation of a device, having:
- means for receiving a request to provide such a security function,
- at least one interface to a location making available such a security function, called a trust anchor,
- wherein said interface is configured to determine an item of context information depending on the application initiating the request,
- means for providing a security function for the application initiating the request, wherein these means are configured to allow the determined item of context information to be integrated into the provision of said security function.

A further aspect of embodiments of the invention may be a computer program or a computer program product (non-transitory computer readable storage medium having instructions, which when executed by a processor, perform actions) having means for performing the method and said configurations thereof when the computer program (product) is executed on an apparatus of the abovementioned type.

The above apparatus and possibly the computer program (product) may accordingly be configured and developed in the same way as the method and the configurations and developments thereof.

Furthermore, a provision device may be provided for storing and/or providing the computer program product. The provision device is for example a data carrier that stores and/or provides the computer program product. As an alternative and/or in addition, the provision device is for example a network service, a computer system, a server system, in particular a distributed computer system, a cloud-based computing system and/or a virtual computing system that stores and/or provides the computer program product preferably in the form of a data stream.

This provision is effected for example as a download in the form of a program data block and/or command data block, preferably as a file, in particular as a download file, or as a data stream, in particular as a download data stream, of the complete computer program product. This provision may for example however also be effected as a partial download that consists of several parts and is in particular downloaded via a peer-to-peer network or provided as a data stream. Such a computer program product is for example read in a system using the provision device in the form of the data carrier and executes the program commands, with the result that the method according to embodiments of the invention is executed on a computer or the creation device is configured such that it creates the apparatus according to embodiments of the invention.

The following and its embodiments have the following advantages:

The advantage of embodiments of the invention lies in the repelling of attacks in which an unauthorized attacker application wants to gain access to the trust anchor.

If an attacker application now takes over a system, finds out which identity ID, which may also comprise data and parameters of the original application, is using an original application and then wants to execute the same security operation or function with the trust anchor, the trust anchor delivers a security function in return that consists of the ID of the original application and the attacker application-specific context information, for example the process number or name, date, hash etc. of the attacker application.

BRIEF DESCRIPTION

Some of the embodiments will be described in detail, with references to the following Figures, wherein like designations denote like members, wherein.

DETAILED DESCRIPTION

Figure 1:
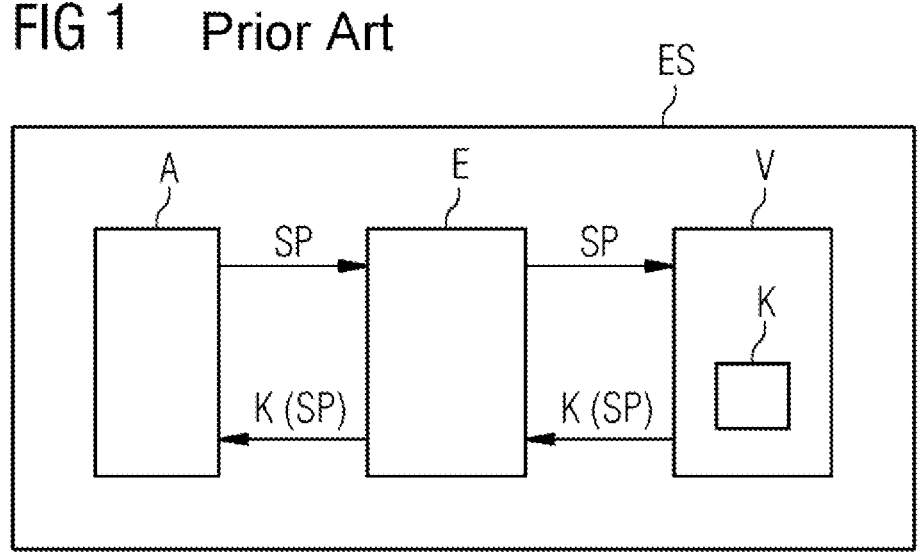
FIG. 1 shows the procedure described in the introduction.
Figure 2:
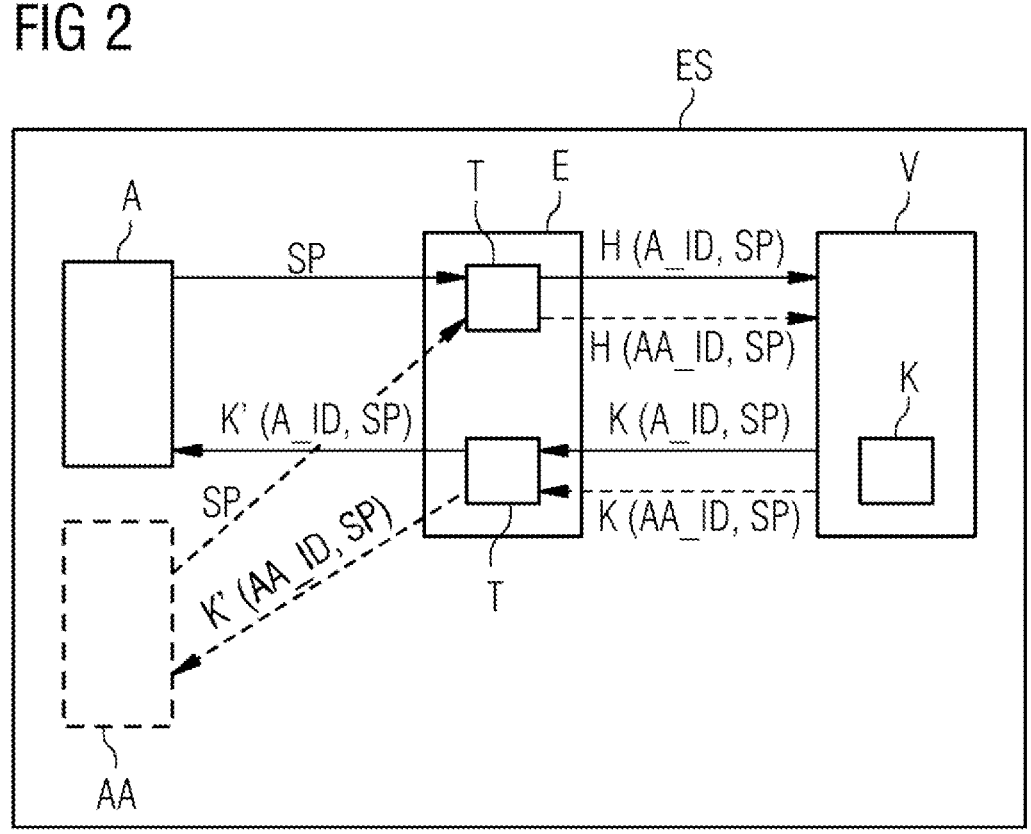
FIG. 2 shows the procedure according to embodiments of the invention when identity/context information with regard to the calling application is added to the security function, for example in the driver of the trust anchor.

FIG. 2 shows an embedded system ES having an apparatus E for providing a cryptographic security function. The embedded system ES in this case comprises applications, for example A, AA. The apparatus E comprises or communicates with a location making available the security function, also called trust anchor V in the present case. The trust anchor V communicates with the apparatus E by way of an interface, which may be designed for example as a driver T. The driver (for example Linux kernel module) of the trust anchor V allows at least one item of context information regarding the application, for example A, requesting or calling the security function to be integrated into the security operation to be executed or to be provided by the trust anchor. An item of context information for example in the form of an item of identity or identification information A_ID of the calling application A is incorporated into the security operation. In the exemplary embodiment, in FIG. 2, two applications A and AA are shown that request a security function K from the trust anchor. In this case, an original application A initiates a request for a security function K. An interface T of the apparatus E furthermore determines for example an item of identification information A_ID of the application A as an item of context information. In one variant, the driver transfers the data and/or parameters obtained from the original application, for example a security parameter SP, together with an item of identification information A_ID determined depending on the calling application, to the trust anchor. In another variant, the interface forms for example, using a one-way or hash function H(A_ID, SP), a parameter or a hash function value that is dependent on a parameter SP able to be predefined by the application and the item of identification information A_ID of the application, and transfers this to the trust anchor V. The trust anchor, by way of the requested security operation, delivers a security function in return, for example as a signature function, as a key function or as a further cryptographic function or operation. In a further variant, the driver may modify the response message received from the trust anchor, which response message may comprise a result of the security function K(SP), depending on the determined item of identification information of the application A, and provide the modified value K'(A_ID, SP) to the application A. In the case of the attacker application, the application AA, in the event of identical calling of the apparatus E, would be provided with a different response value K'(AA_ID, SP) by the apparatus. All of the above procedures may also be combined with one another.

Possible such context information would be, inter alia (individually or in combination):
  the name of the application
  the creation date of the application
  hash value of the executable file
  the user name that calls the application
  the user group that calls the application
  the process ID of the process that calls the application
  the namespace of the process or of the user that calls the application. Within a namespace, objects may be addressed unambiguously, for example via pathnames,
  the name or namespace of the device via which the ESK (embedded security kernel) is addressed (for example in Linux: '/dev/esk'),
  a (security enhanced Linux) identifier or operating system-specific identifier of the accessing user or process or of the device or system (role, user name, domain, type, context)
  other (operating system-specific) data regarding the application or the current state.

In the same way as for the original application A, an attacker application AA may access the trust anchor V. Even if the attacker application AA were to know the item of identification information A_ID of the original application A, a second item of identification information AA_ID of the attacker application AA in this case goes into the security function K of the trust anchor V. The attacker application AA is thus able only to have delivered in return results of security functions into which the second item of information of the attacker application AA has been inserted. The attacker application AA then obtains a response value K(AA_ID, SP) or K'(AA_ID, SP) (for example a derived key) that does not match the response value K(A_ID, SP) or K'(A_ID, SP) (for example derived key) of the original application A.

To attack such a system successfully, the attacker application AA would have to attack parts of the operating system. This is hardly possible, or if so is possible only with a very large amount of effort. Furthermore, it is not necessary to restrict access to an apparatus or an interface to a trust anchor, which is often technically not feasibly able to be implemented and would be associated with a high configuration expenditure. It is authorized in this case for an attacker application or another application to access the trust anchor. However, a situation is achieved whereby the attacker application or other application is not able to call the same security function as the first application.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for providing a cryptographic security function for the operation of a device, wherein the following method steps are executed:
  receiving a request to provide the cryptographic security function,
  providing an interface to a trust anchor, the trust anchor making available the cryptographic security function,
  wherein said interface determines an item of context information depending on the application initiating the request, the item of context information comprising the identity of the application,
  providing the requested cryptographic security function for the application initiating the request,
  wherein the determined item of context information is integrated into the provision of the cryptographic security function, and
  wherein the item of context information at least one of modifies and influences a value resulting from the cryptographic security function.

2. The method as claimed in claim 1, wherein the item of context information is integrated into the provision of the cryptographic security function as a parameter.

3. The method as claimed in claim 1, wherein the interface transfers the determined item of context information to the trust anchor.

4. The method as claimed in claim 1, wherein the item of context information is transferred in a secure format.

5. The method as claimed in claim 4, wherein the secure format is achieved by conversion by way of a one-way function or by way of a signature or by way of an authentication code or by way of generation or derivation of a key.

6. An apparatus for providing a cryptographic security function for the operation of a device, having:
  means for receiving a request to provide the cryptographic security function,
  at least one interface to a trust anchor, the trust anchor making available the cryptographic security function,
  wherein said interface is configured to determine an item of context information depending on the application initiating the request, the item of context information comprising the identity of the application,
  wherein the item of context information is integrated into the provision of the cryptographic security function as a one-way function value,
  means for providing the cryptographic security function for the application initiating the request, wherein these means are configured to allow the determined item of context information to be integrated into the provision of the cryptographic security function, and wherein the item of context information at least one of modifies and influences a value resulting from the cryptographic security function.

7. The apparatus as claimed in claim 6, wherein the item of context information is integrated into the provision of the cryptographic security function as a parameter.

8. The apparatus as claimed in claim 6, wherein the interface is configured to transfer the determined item of context information to the trust anchor.

9. The apparatus as claimed in claim 6, wherein the item of context information is able to be transferred in a secure format.

10. The apparatus as claimed in claim 9, wherein the secure format is able to be achieved by conversion by way of a one-way function or by way of a signature or by way of an authentication code or by way of generation or derivation of a key.

11. A computer program having means for performing a method for providing a cryptographic security function when the computer program is executed on an apparatus said computer program having a non-transitory computer readable storage medium having instructions, which when executed by a processor, perform actions, wherein the method comprises:
  receiving a request to provide the cryptographic security function,
  providing an interface to a trust anchor, the trust anchor making available the cryptographic security function,
  wherein said interface determines an item of context information depending on the application initiating the request, the item of context information comprising the identity of the application initiating the request; wherein the item of context information is integrated into the provision of the cryptographic security function as a one-way function value, and
  providing the requested cryptographic security function for the application initiating the request,
  wherein the determined item of context information is integrated into the provision of the cryptographic security function, and
  wherein the item of context information at least one of modifies and influences a value resulting from the cryptographic security function.

\* \* \* \* \*